United States Patent [19]
Nakamura

[11] Patent Number: 6,062,390
[45] Date of Patent: May 16, 2000

[54] PACKAGE FOR RECORDING HEAD UNIT, METHOD FOR PACKAGING THE SAME, AND COMBINATION OF PACKAGE AND RECORDING HEAD UNIT OF INK-JET RECORDING APPARATUS

[75] Inventor: Hirotake Nakamura, Nagoya, Japan

[73] Assignee: Brother Kogyo Kabushiki Kaisha, Nagoya, Japan

[21] Appl. No.: 09/095,571

[22] Filed: Jun. 11, 1998

[30] Foreign Application Priority Data

Jun. 12, 1997 [JP] Japan .................................. 9-155325

[51] Int. Cl.[7] .................................................. B65D 85/30
[52] U.S. Cl. ........................ 206/576; 206/701; 206/524.8; 53/469; 53/474
[58] Field of Search ............................. 53/469, 474, 473, 53/239, 237; 206/701, 576, 320, 524.8, 484, 524.2

[56] References Cited

U.S. PATENT DOCUMENTS

| | | | |
|---|---|---|---|
| 4,813,210 | 3/1989 | Masuda et al. | 206/524.8 X |
| 4,823,961 | 4/1989 | Griesbach et al. | 206/524.8 X |
| 5,074,418 | 12/1991 | Buan et al. | 206/576 |
| 5,131,539 | 7/1992 | Karita et al. . | |
| 5,217,118 | 6/1993 | Mochizuki et al. | 206/524.8 X |
| 5,231,425 | 7/1993 | Masuda et al. | 206/701 X |
| 5,244,087 | 9/1993 | Hikake et al. | 206/701 |
| 5,477,963 | 12/1995 | Mochizuki et al. | 206/524.8 X |

FOREIGN PATENT DOCUMENTS

59-143647  8/1984  Japan .

*Primary Examiner*—Jacob K. Ackun
*Attorney, Agent, or Firm*—Oliff & Berridge, PLC

[57] ABSTRACT

When a recording head unit for an ink-jet printer is shipped, the recording head is filled with a preservative solution, and nozzle surfaces of the recording head are covered with a nozzle protector, while ink-supply ports, to which an ink-cartridge is to be connected, are sealed with a stopper, in order to prevent leakage or evaporation of the preservative solution. Then, the entire recording head unit is vacuum packed in a pouch-like conforming sealing member having a layered structure which is non-permeable to gases. This structure can reliably prevent the preservative solution from evaporating, and keep the interior of the recording head in good condition even if the recording head is stored for a long span of time.

23 Claims, 11 Drawing Sheets

Fig. 1

RELATED ART

PACKAGE FOR RECORDING HEAD UNIT, METHOD FOR PACKAGING THE SAME, AND COMBINATION OF PACKAGE AND RECORDING HEAD UNIT OF INK-JET RECORDING APPARATUS

BACKGROUND OF THE INVENTION

1. Field of the Invention

This invention relates to a package for a recording head unit of an ink-jet recording apparatus, a method for packaging such a recording head unit, and a combination of a package and a recording head unit of an ink-jet recording apparatus.

2. Description of the Related Art

A conventional ink-jet printer is a good example of an ink-jet recording apparatus which performs a recording operation by ejecting ink toward a recording medium (i.e., a sheet of paper).

In an ink-jet printer, a recording head for ejecting ink is incorporated in the recording head unit, which is then mounted on a carriage of the ink-jet printer. An ink cartridge containing ink is inserted into the recording head unit in order to supply ink to the recording head. If the ink runs out, the ink cartridge is replaced with a new one.

Prior to shipping such recording head units for ink-jet printers from factories, each recording head unit is filled with a preservative solution that has the same property as ink, except that it does not contain a dye or pigment, in order to smoothly introduce the ink into the recording head at the very beginning of the use without causing bubbles in the ink.

Figure 1:
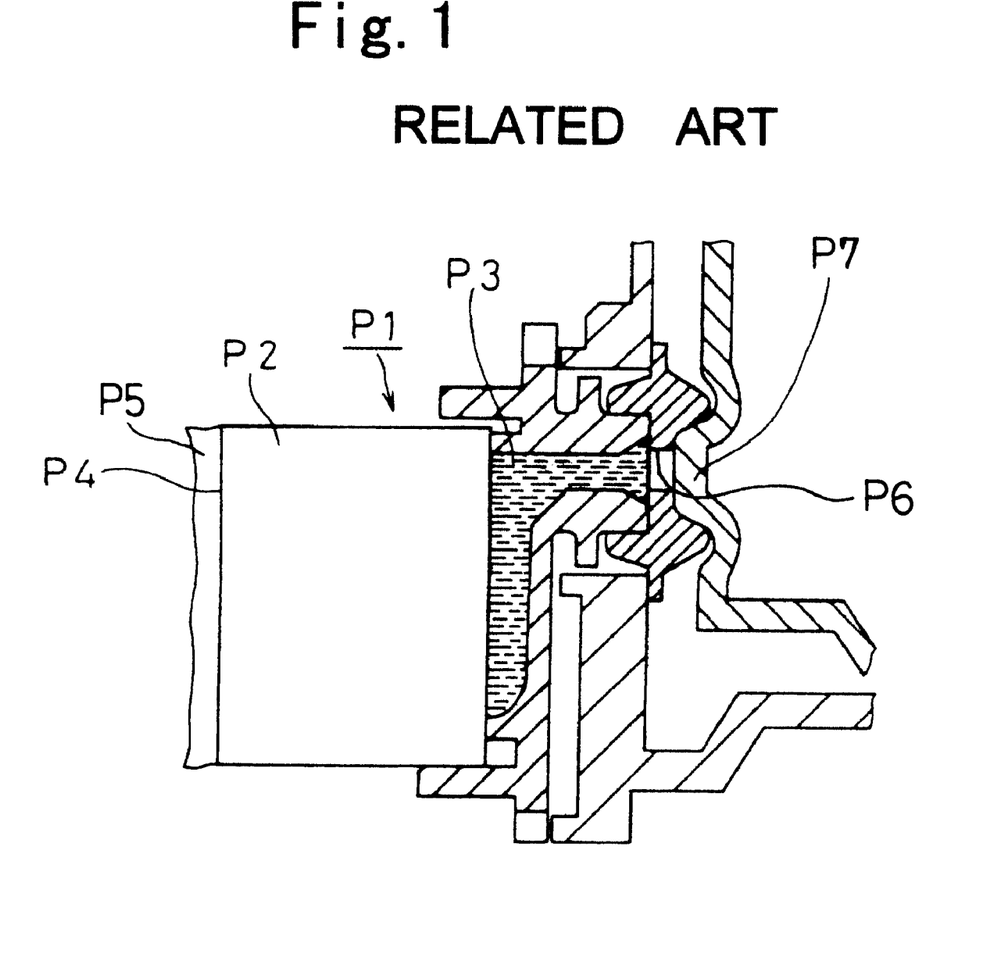
FIG. 1 is a cross-sectional view of a conventional recording head.

FIG. 1 illustrates a conventional recording head P1. In the recording head P1, channels (not shown) in the jet nozzles P2 and the manifold P3 are filled with the preservative solution before they are shipped. A nozzle protector P5 is attached to the nozzle surface P4 of the jet nozzle P2 for the purpose of preventing the preservative solution from leaking and protecting the nozzle surface P4. The nozzle protector P5 is, for example, a peelable seal, i.e., sealing tape which can peel from the surface of the nozzle of the ink-jet head unit, or a cap made of rubber or resin. Furthermore, a stopper P7 is provided at the ink supply port P6 in order to prevent the preservative solution from leaking at the ink supply side.

However, even if the nozzle protector P5 and the stopper P7 are provided for the recording head unit, the preservative solution in the recording head P1 gradually evaporates into the environment from small gaps between the recording head P1 and the nozzle protector P5 or the stopper P7, and the interior of the recording head P1 may become dry after being stored for a long period.

If the inside of the recording head P1 becomes dry, the effect of the preservative solution for smoothly introducing ink into the recording head P1 without causing bubbles is lost.

These types of recording head units are often shipped as individual parts, as opposed to being installed in ink-jet printers. In such a case, the recording head units may be stocked for a long period of time. Accordingly, the problem arises that the interior of the recording head P1 becomes dry.

SUMMARY OF THE INVENTION

Therefore, it is an object of the invention to overcome the problems of the conventional art, and to provide a package for a recording head unit of an ink-jet recording apparatus, which can keep the preservative solution filled in the recording head for a long period of time by effectively preventing the preservative solution from evaporating, and which allows ink to be smoothly introduced into the recording head from an ink cartridge at the first use without generating bubbles in the ink. It is also an object of the invention to provide a method for packaging the recording head unit, which can keep the preservative solution in the recording head for a long time, while preventing the solution from evaporating.

In order to achieve these objects, a package for a recording head unit of an ink-jet recording apparatus includes a sealing member that is non-permeable to gases. The recording head unit includes a recording head which is filled with a preservative solution prior to shipping, and the package can seal up the entire recording head.

The sealing member has a layered structure that includes a plurality of layers, each layer being non-permeable to gases.

Preferably, the sealing member is a pouch made of a non-permeable sheet having a layered structure. In such a case, the recording head unit is packed in the pouch-like sealing member with the gap between the sealing member and the recording head unit evacuated. Specifically, the air between the sealing member and the recording head unit is sucked out from inside of the package. Thus, the recording head unit is vacuum-packed via the non-permeable sheet having a layered structure.

The layered structure of the sealing member comprises at least two resin layers.

Preferably, the sealing member includes a polyethylene terephthalate layer that is highly non-permeable to gases.

The layered structure of the sealing member includes a polyethylene layer, a nylon layer, and a polyethylene terephthalate layer.

The layered structure of the sealing member may include a poly(vinylidene chloride) layer, a nylon layer, and a polyethylene terephthalate layer, or alternatively, it may include a moistureproof cellophane layer, a nylon layer, and a polyethylene terephthalate layer.

It is also preferable that the sealing member include a vinyl chloride layer, a nylon layer, and a polyethylene terephthalate layer.

It is also preferable that the sealing member include a polymethyl pentene resin layer, a nylon layer, and a polyethylene terephthalate layer.

A printed face may be included in the middle of the layered structure.

A thin aluminum layer may be included in the layered structure. In such a case, the layered structure of the sealing member preferably includes a polyethylene layer, a nylon layer, a thin aluminum layer, and a polyethylene terephthalate layer.

The recording head unit has an ink-inlet port at one end, to which an ink cartridge, that contains ink, is detachably connected, and nozzle holes at the other end, from which the ink is ejected. The space between the ink-inlet port and the nozzle holes inside the recording head is filled with a preservative solution. A nozzle protector, that covers the nozzle holes, is detachably provided to the recording head unit before the recording head unit is packed. A stopper is also detachably provided to the ink-inlet port so that the ink-inlet port is sealed until an ink cartridge is connected to the ink-inlet port.

In another aspect of the invention, a method for packing a recording head unit of an ink-jet recording apparatus is provided. This method comprises the steps of filling the interior of the recording head unit with a preservative solution, and sealing the entire recording head unit with a sealing member that is non-permeable to gases.

This method may further comprise the steps of preparing a sleeve-like sealing member made of a non-permeable material, sealing one end of the sleeve-like sealing member, while leaving the other end open, so as to form a pouch, inserting the recording head unit in the pouch-like sealing member, and sealing the open end of the sealing member.

The method may further comprise the step of evacuating the pouch-like sealing member in which the recording head is inserted.

The recording head unit packed in the sealing member has an ink-inlet port at one end, to which an ink cartridge that contains ink is to be connected, and nozzle holes at the other end, from which the ink is ejected. The method may further comprise the steps of filling the space between the ink-inlet port and the nozzle hole inside the recording head unit with a preservative solution, covering the nozzle holes with a nozzle protector, and covering the ink-inlet port with a stopper which is not to be removed until an ink cartridge is actually attached to the recording head unit.

In still another aspect of the invention, a combination of a recording head unit of an ink-jet recording apparatus and a package for packaging the recording head unit is provided. The recording head unit is filled with a preservative solution before it is shipped. The package comprises a sealing member that is non-permeable to gases and seals the entire recording head unit.

The package for a recording head unit according to the invention can reliably prevent the recording head unit from drying after being stored for a long time, while effectively preventing the preservative solution filled in the recording head from evaporating. Accordingly, ink can be smoothly introduced into the recording head unit from an ink cartridge at the very beginning of use without generating bubbles in the ink.

The non-permeable sealing member may have a fixed shape. However, a pouch-like sealing member made of a non-permeable sheet is preferable because it can reduce the total volume and weight of the shipped products, which is also convenient for storage.

If the recording head unit is packed in the pouch-like sealing member with the gap between the sealing member and the recording unit evacuated, the anti-evaporation effect increases, while the total volume of the shipped product can be further reduced, because the amount of evaporation of the preservative solution into the environment can be minimized with nominal air gap inside the sealing member.

BRIEF DESCRIPTION OF THE DRAWINGS

A preferred embodiment of the invention will be described in detail with reference to the attached drawings wherein.

DETAILED DESCRIPTION OF THE PREFERRED EMBODIMENTS

The preferred embodiments of the invention will now be described with reference to the attached drawings.

Figure 2:
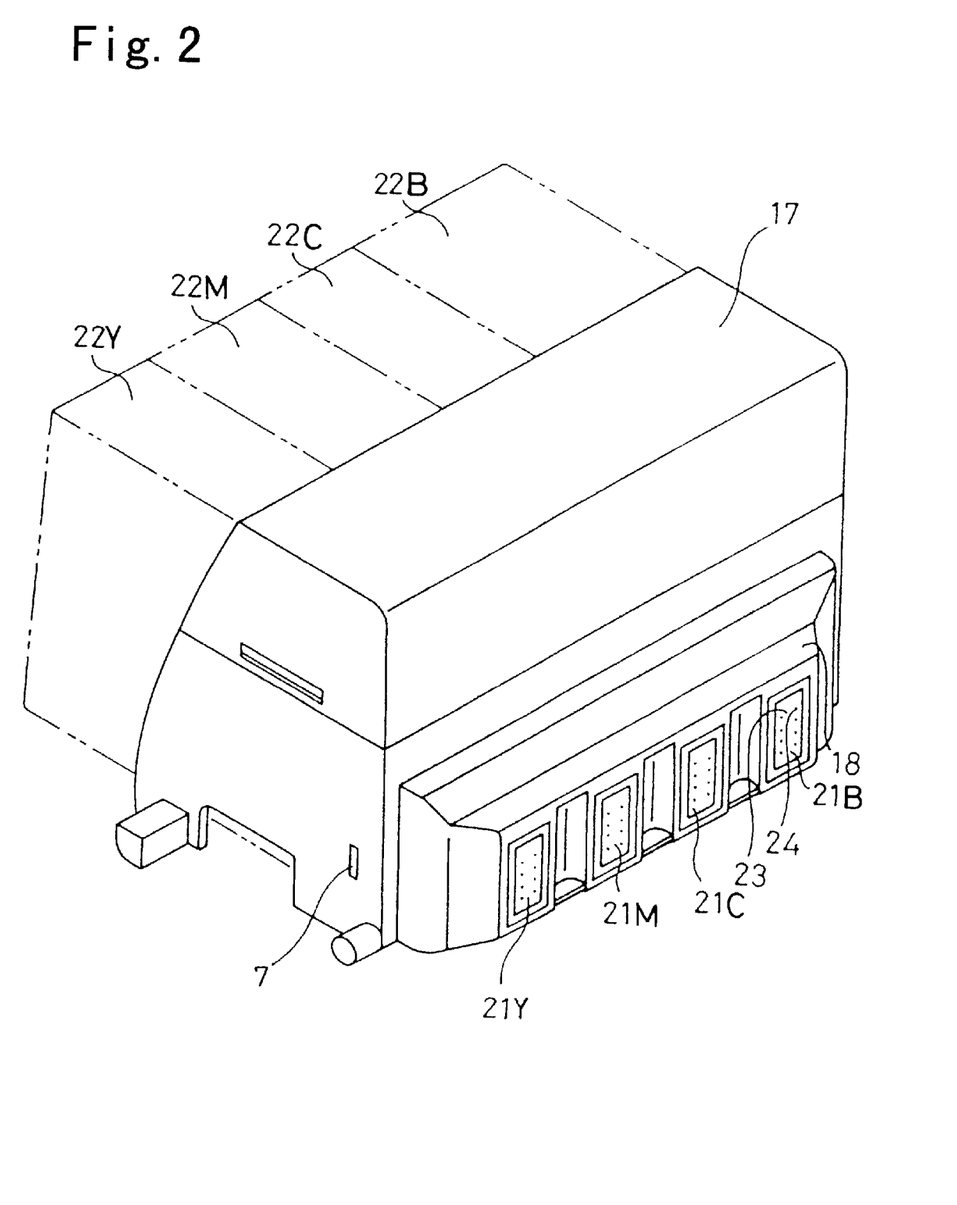
FIG. 2 is a perspective view of the recording head unit according to an embodiment of the invention.

FIG. 2 is a perspective view of a recording head unit 17 according to an embodiment of the invention.

The recording head unit 17 is mounted on a carriage (not shown) of an ink-jet printer that is in the actual use, and it may be shipped as an assembly already mounted on the carriage. However, the invention assumes the case in which the recording head unit is shipped as an individual part separate from the carriage.

A recording head 18 for performing a printing or recording action is provided at the front face (i.e., the right face in FIG. 2) of the recording head unit 17. The recording head unit 17 described in this embodiment is of a color ink-jet type, which ejects ink droplets of four colors (cyan (C), magenta (M), yellow (Y), and black (B)) onto a recording sheet.

The recording head 18 has four ejection nozzles 21Y, 21M, 21C, and 21B (which may be simply referred to as nozzles 21). A plurality of (for example, sixty four) ejection holes 24 are formed on the nozzle surface 23 of each ejection nozzle 21. In actual use, four ink cartridges 22Y, 22M, 22C, and 22B are detachably attached to the rear side (the left side in FIG. 2) of the recording head unit 17 in order to supply ink to the corresponding ejection nozzles 21, as indicated by the two-dot-broken line in FIG. 2.

When the recording head unit 17 is shipped, a nozzle protector 1 is provided at the ejection side (i.e., the recording head side) of the recording head unit 17 in order to protect the nozzle surface 23 of each of the ejection nozzles 21. The nozzle protector 1 is removed when the recording head unit 17 is actually used in an ink-jet printer. The nozzle protector 1 will be described in more detail below with reference to FIGS. 3A, 3B and 4.

Figure 3A:
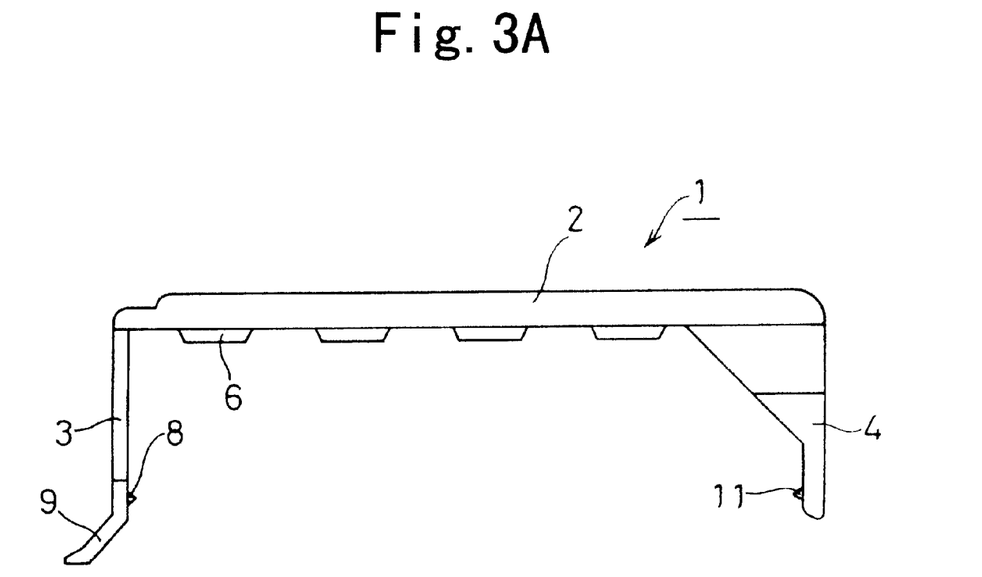
FIG. 3A is a plan view of a nozzle protector attached to the recording head.

As shown in FIG. 3A, the nozzle protector 1 is a U-shaped cover made of hard plastic, and comprises a base plate 2, a first arm 3 extending from one end of the base plate 2, and a second arm 4 extending from the other end of the base plate 2.

Four caps 6 are provided in the inner face of the base plate 2 at positions corresponding to the four nozzle surfaces 23 of the ejection nozzles 21. These caps 6 cover the nozzle surfaces 23 in an airtight manner when the protector 1 is attached to the recording head 18.

Figure 3B:
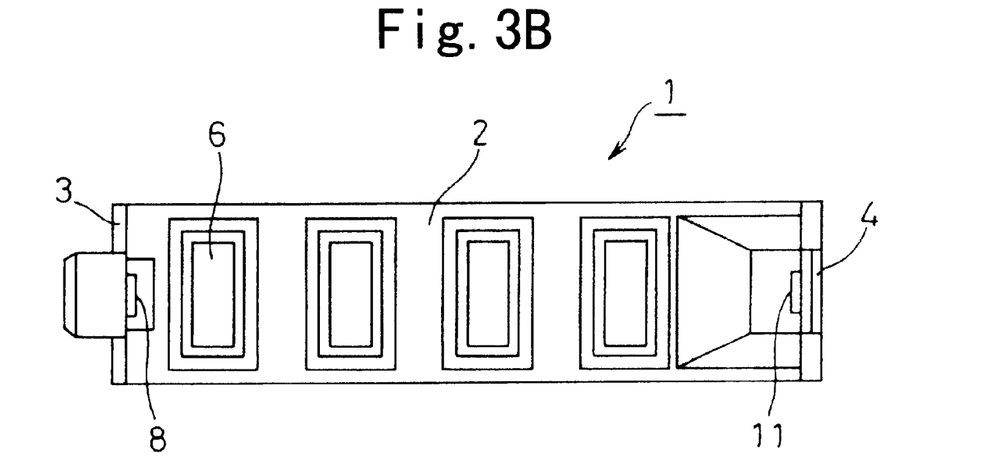
FIG. 3B is a front view of the nozzle protector.

As shown in FIGS. 3A and 3B, the first arm 3 has a first projection 8 in its inner face near the end. This projection 8 is inserted into a first hole 7 formed in the side face of the recording head unit 17. Similarly, the second arm 4 has a second projection 11 in its inner face near the end, which is inserted into the second hole (not shown) formed in the other side face of the recording head unit 17.

Figure 4:
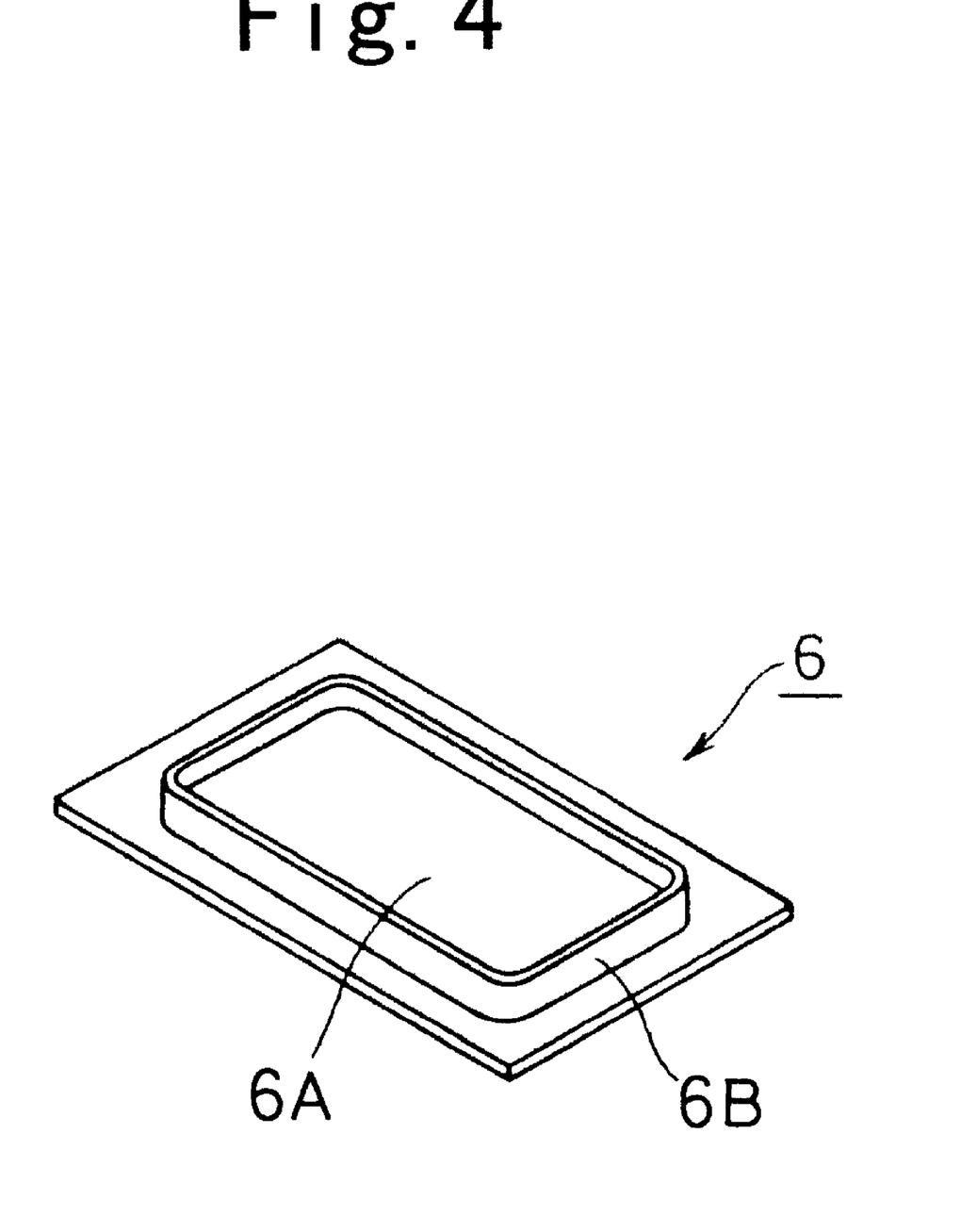
FIG. 4 is a perspective view of the cap provided onto the nozzle protector.

The tip of the first arm 3 is bent outward, which serves as a hook so that a user can easily remove the nozzle protector 1. The caps 6 are made of an elastic material (e.g., butyl rubber). Each cap 6 comprises a rectangular top lid 6A and a rib 6B projecting from the back surface of the top lid 6 at a height of 0.8 mm along the periphery of the top lid 6A. When the nozzle protector 1 is attached to the recording head 18, the rib 6B of each cap 6 surrounds the side walls of the corresponding nozzle 21.

Figure 5A:
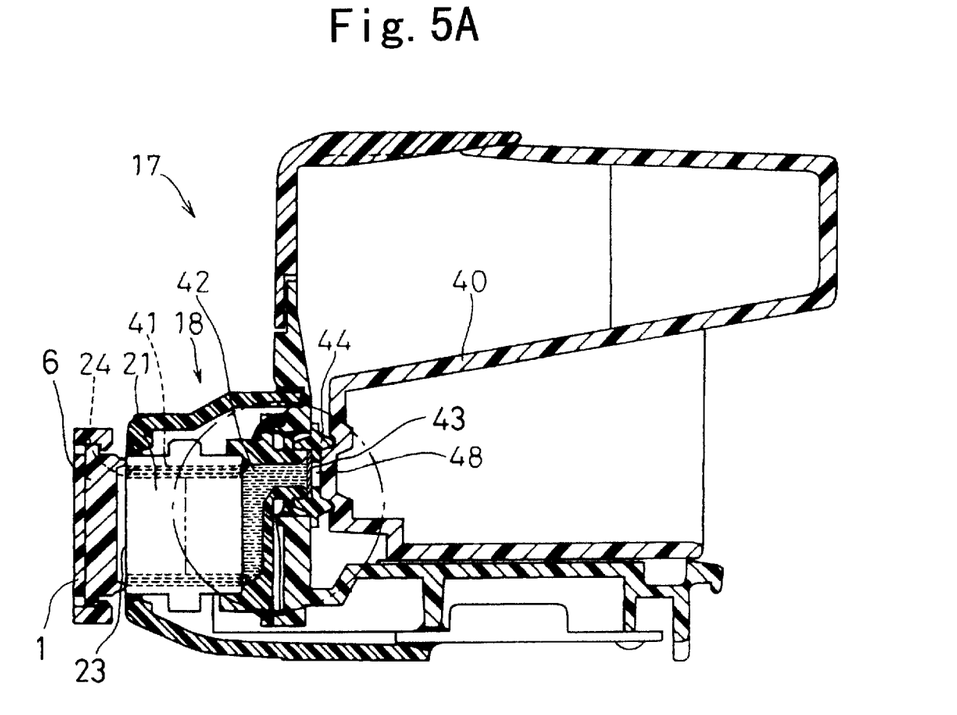
FIG. 5A is a cross-sectional view that illustrates how the nozzle protector and the stopper are attached to the recording head unit.
Figure 5B:
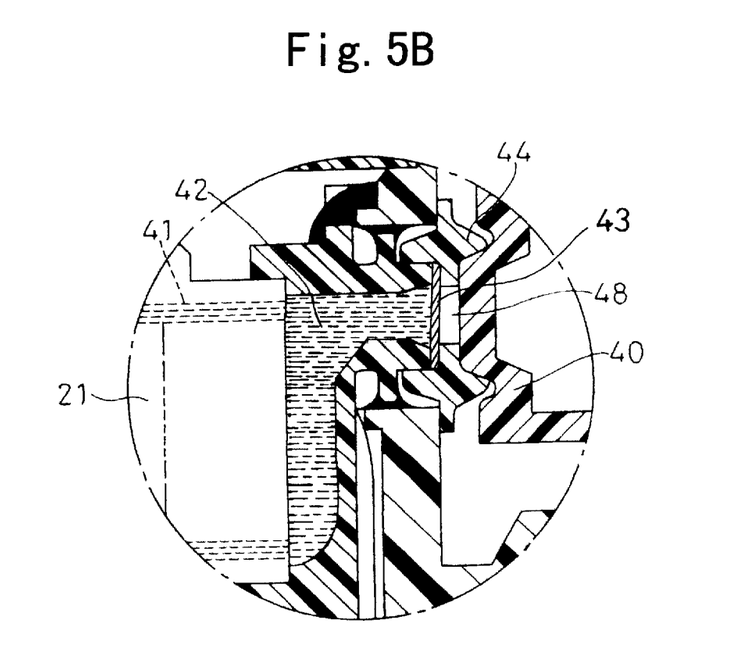
FIG. 5B is a partially enlarged cross-sectional view of FIG. 5A.
Figure 6A:
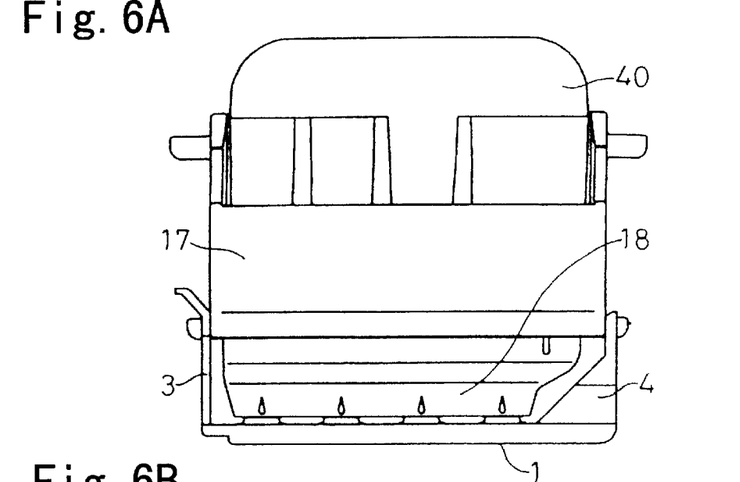
FIG. 6A is a plan view that illustrates how the nozzle protector and the stopper are attached to the recording head unit.
Figure 6B:
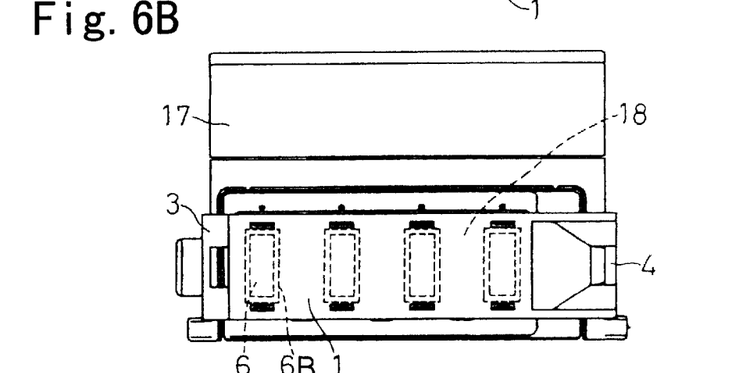
FIG. 6B is a front view of FIG. 6A.
Figure 6C:
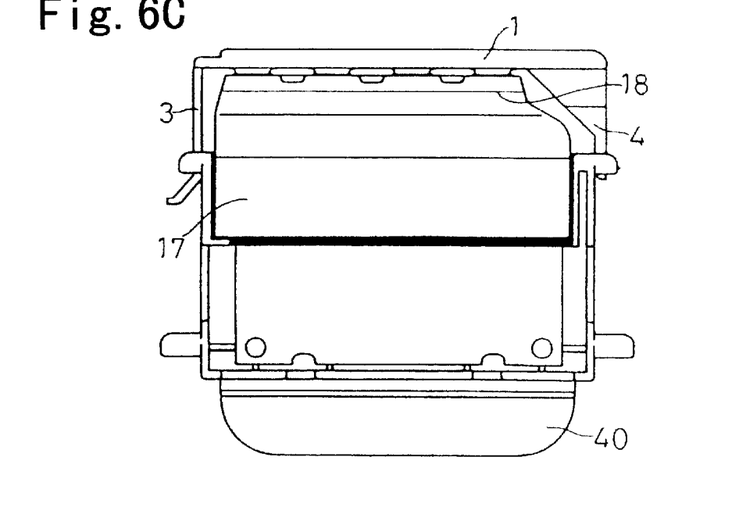
FIG. 6C is a bottom view of FIG. 6A.
Figure 7A:
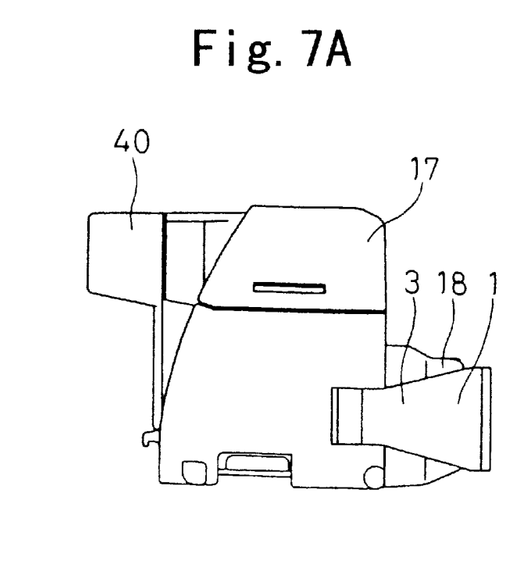
FIG. 7A is a left side view that illustrates how the nozzle protector and the stopper are attached to the recording head unit.
Figure 7B:
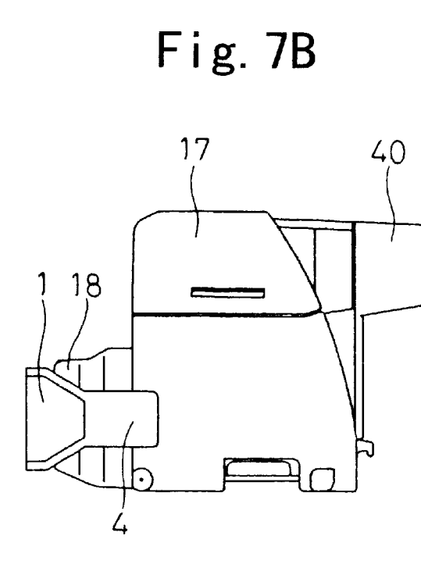
FIG. 7B is a right side view that illustrates the same.
Figure 7C:
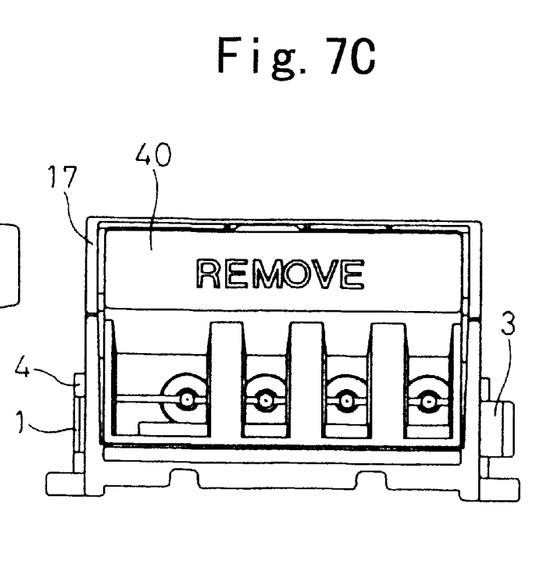
FIG. 7C is a rear elevational view that illustrates the same.

FIGS. 5A and 5B show the inside structure of the recording head unit 17. The ejection nozzles 21 provided to the recording head 18 are conventional actuators formed by machining a piezoelectric material. A plurality of ink passages, referred to as channels 41, are formed in each of the nozzles 21. Each channel 41 extends between the ejection hole 24 of the nozzle surface 23 (the left side of the ejection nozzle 21 in FIG. 5A) and the ink-inlet hole (the right side of the ejection nozzle 21 in FIG. 5A) which communicates with the associated manifold 42. Four manifolds 42 are provided in the recording head 18 so as to correspond to the respective ejection nozzles 21. A filter 43 is provided to the ink-inlet port of each manifold 42 in order to remove dust or undesirable particles.

A connector 44 made of an elastic material (such as rubber) is provided around the filter 43. The connector 44 is used to connect the ink cartridge 22 or a stopper 40 (which is described below) to the recording head unit 17. The connector 44 defines an ink-supply port 48, through which the ink is supplied into the manifold 42 from the ink cartridge 22 when it is attached to the recording head unit 17.

In the actual use, the ink supplied from the ink cartridge 22 to the manifold 42 via the ink-supply port 48 flows into all of the channels 41. The ink is ejected from the selected election holes 24 by applying a voltage to the ejection nozzles 21 to change the passage size of the selected channels 41.

When shipping the recording head unit 17, a preservative solution is filled in the recording head 18, that is, in the manifolds 42 and the channels 41 of each ejection nozzle 21. The nozzle surfaces 23 are covered with the nozzle protector 1, while the ink-supply side (the right side in FIG. SA), to which ink cartridges are to be connected, is sealed up by a stopper 40.

The stopper 40 seals the ink-supply ports 48 corresponding to the respective ejection nozzles 21 all together. When the recording head unit 17 is actually used, the stopper 40 is removed from the recording head unit 17, and ink cartridges of four colors are attached to the recording head unit 17.

Thus, the nozzle surfaces 23 of the ejection nozzles 21 are covered with the caps 6 of the nozzle protector 1 in an air-tight manner, while the ink supply ports 48 are sealed by the stopper 40, with the channels 41 and the manifolds 42 filled with the preservative solution. This structure can prevent the preservative solution from leaking or evaporating from the recording head 18.

FIGS. 6A through 6C and 7A through 7C show how the nozzle protector 1 and the stopper 40 are attached to the recording head unit 17. The nozzle protector 1 is secured to the recording head 18 so that the first and second arms 3 and 4 are pressed against the side walls of the recording head unit 17. At this time, the first and second projections 8 and 11 are inserted into the holes 7 formed in the side walls of the recording head unit 17.

In this state, the ejection surfaces 23 are covered with the caps 6 of the nozzle protector 1. While the ejection side (i.e., the recording head side) of the recording head unit 17 is stopped by the nozzle protector 1, the ink-supply side (to which ink cartridges 22 are to be connected) is stopped by the stopper 40, so that the preservative solution filled in the recording head 18 will not leak or evaporate.

When the recording head unit 17 is mounted on the carriage of an ink-jet printer, the nozzle protector 1 and the stopper 40 are removed from the recording head unit 17 and, instead, four colors of ink cartridges 22 are attached to the recording head unit 17. A conventional suction device comprising a suction pump and a suction cap is installed in the ink-jet printer. The suction device sucks up the ink from the ink cartridges through the nozzle surfaces 23 of the ejection nozzles 21, whereby the ink is initially introduced into the associated manifold 42 and the channels 41. After this initial introduction of ink (that is, so-called initial purge), the printing operation is started.

The preservation solution filled in the channels 41 of the ejection nozzles 21 and the manifolds 42 allows the ink to be smoothly introduced into the recording head 18 without generating bubbles in the ink.

However, manufacturing variations or slight defects in the nozzle protector 1 and the stopper 40 may create small gaps between the nozzle surfaces 23 and the caps 6 of the nozzle protector 1, or between the recording head unit 17 and the stopper 40. These small gaps may cause the preservative solution filled in the recording head 18 to evaporate into the environment when the recording head 18 is stored for a long period of time. If the interior of the recording head 18 is not filled with the solution, the effect of the preservative solution (that is, the smooth initial purge without causing bubbles in the ink) is not adequately attained.

Figure 8A:
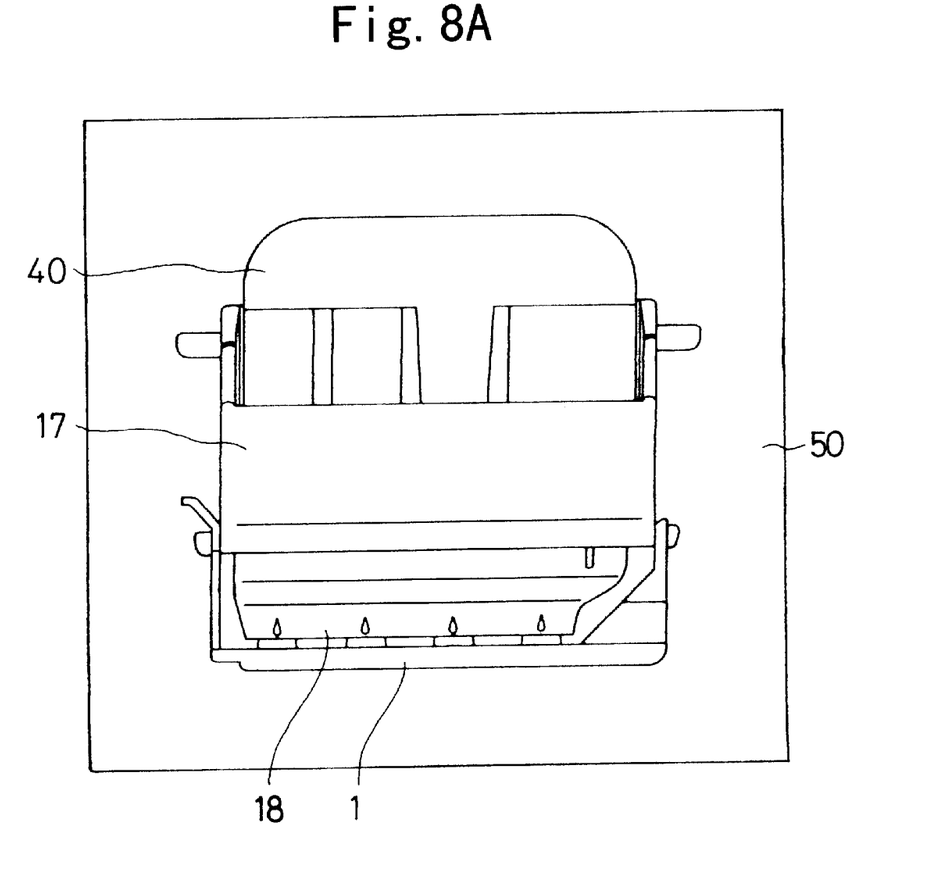
FIG. 8A is a plan view that illustrates the packed recording head unit for shipping.
Figure 8B:
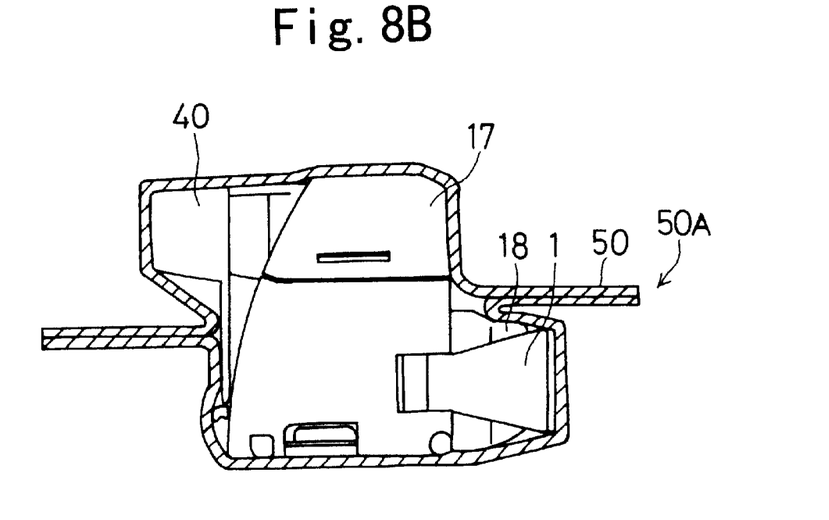
FIG. 8B is a cross-sectional view that illustrates the same.

In order to overcome this problem, in the preferred embodiment, a pouch-like sealing member 50 is used to pack the recording head unit 17 which is filled with the preservative solution and covered with the nozzle protector 1 and the stopper 40. (Hereinafter, the term "recording head unit 17" implies one that is filled with the preservative solution and sealed up.) FIGS. 8A and 8B illustrate the recording head unit 17 packed in the pouch-like sealing member 50 prior to shipping in a plane view and a left side view, respectively, with the sealing member 50 cut away.

Figure 9:
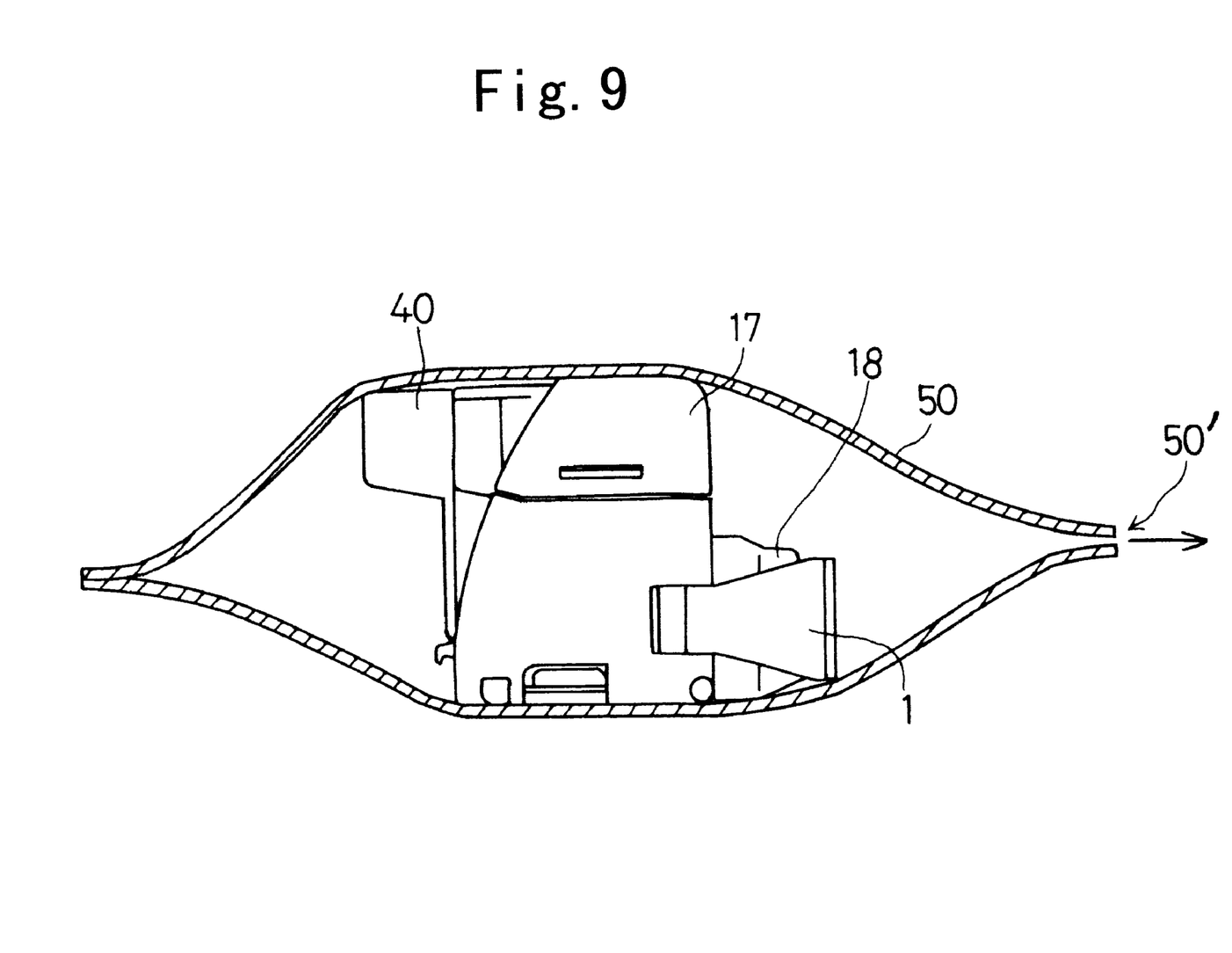
FIG. 9 is a cross-sectional view showing how the recording head unit is packed prior to shipping.

The sealing member 50 is a square pouch with three ends sealed and one end open. When packing the recording head unit 17 in a factory, the recording head unit 17 is inserted in the pouch 50 from the open end 50' as shown in FIG. 9, and then, the inner space of the pouch 50 is evacuated so that the pouch sticks to the recording head unit 17. Finally, the open end 50' is sealed by, for example, thermal welding. In the preferred embodiment, the pouch 50 is made of a layered sheet which is non-permeable to gases and includes a polyethylene layer.

The pouch-like sealing member 50 illustrated in FIGS. 8A, 8B and 9 can reliably prevent evaporation of the preservative solution. Even if the packed recording head unit 17 is stored for a long time, the preservative solution can be kept in the recording head 18 and, accordingly, the ink can be smoothly introduced into the recording head 18 at the initial use without generating bubbles in the ink.

The sealing member may be a container made of a non-permeable layered material and having a fixed shape. However, the pouch-like sealing member 50 is more advantageous in shipping and storage because it can reduce the entire volume and weight of the packed product.

In this embodiment, the pouch-like sealing member 50 containing the recording head unit 17 is evacuated before the open end 50' is sealed. Accordingly, the air gap between the sealing member 50 and the recording head unit 17 is minimized, and the evaporation of the preservative solution filled in the recording head 18 can also be minimized.

Figure 10:
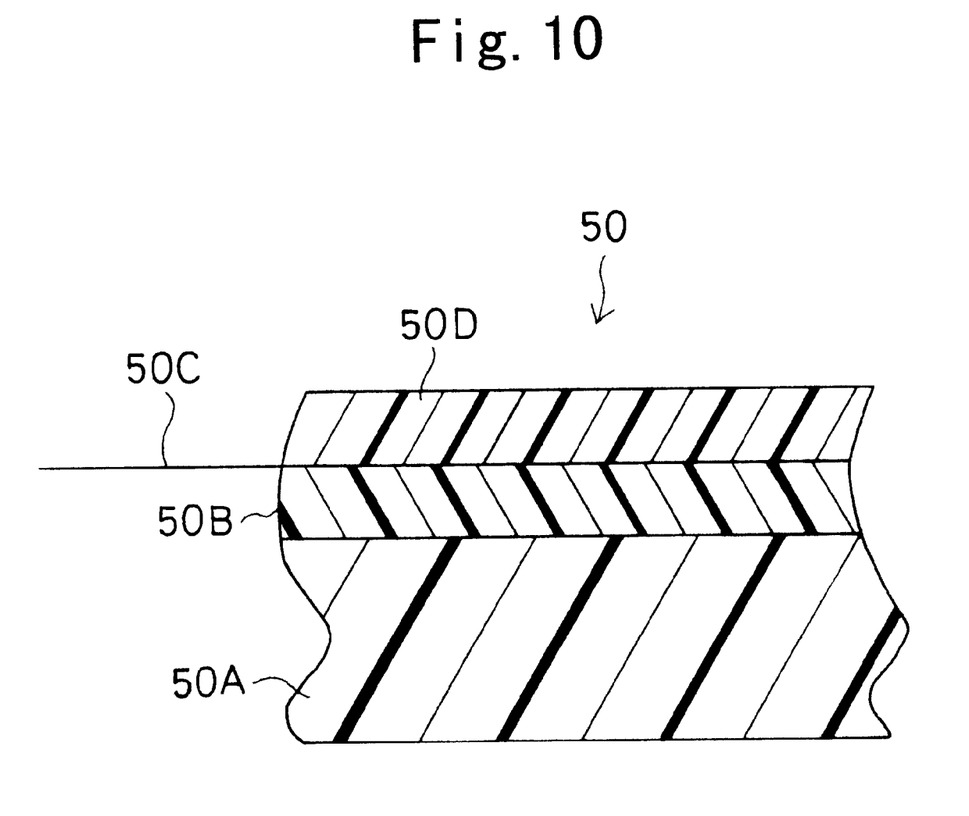
FIG. 10 is a cross-sectional view of a packing sheet according to an embodiment of the invention.

Next, the layered structure of the sheet material of the pouch-like sealing member 50 will be explained with reference to FIGS. 10 and 11. FIG. 10 is a cross-sectional view of the sheet material of the sealing member 50, and FIG. 11 shows a modified pouch-like sealing member 50.

The sheet material of the pouch-like sealing member 50 comprises a polyethylene layer 50A having a thickness of 50 μm, which is the base material of the sealing member 50. A nylon layer 50B having a thickness of 15 μm is formed on the polyethylene layer 50A, and a printed surface 50C is placed on the top face of the nylon layer 50B. The printed surface 50C is covered with a polyethylene terephthalate layer 50D having a thickness of 12 μm, which is highly non-permeable to gases. This layered structure can completely prevent permeation of gases through the sealing member 50. In addition, since the printed surface 50C is protected by the polyethylene terephthalate layer 50D, the weatherproofness and the abrasion resistance of the printed surface 50C can be improved.

Figure 11:
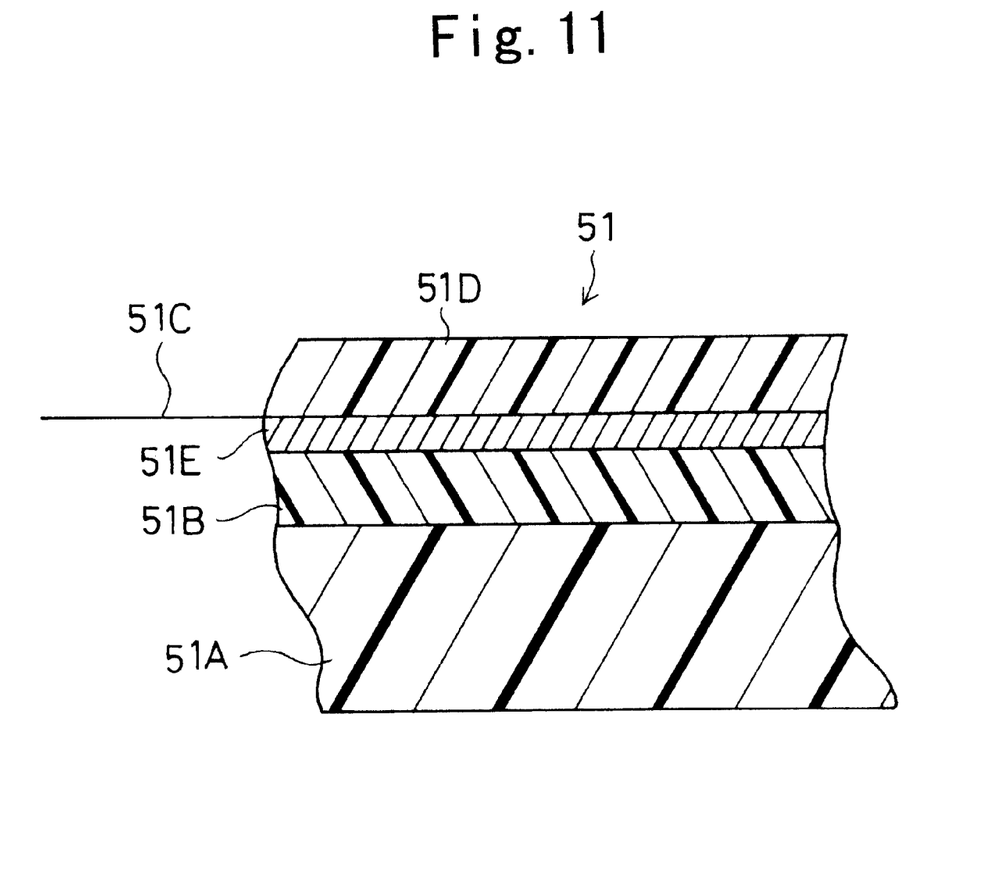
FIG. 11 is a modification of the packing sheet shown in FIG. 10.

The layered structure shown in FIG. 10 can be modified as shown in FIG. 11. The sheet material 51 comprises a polyethylene layer 50A having a thickness of 50 μm, which is the base material of the pouch-like sealing member. A nylon layer 51B having a thickness of 15 μm is formed on the polyethylene layer 51A, and a thin aluminum layer 51E having a thickness of 5 m is formed on the nylon layer 51B. A printed surface 51C is placed on the top face of the thin aluminum layer 51E. The printed surface 51C is covered with a polyethylene terephthalate layer 51D having a thickness of 12 μm. Again, since the printed surface 51C is protected by the polyethylene terephthalate layer 51D, the weatherproofness and the abrasion resistance of the printed surface 51C can be improved. Furthermore, inserting the thin aluminum layer 51E in the middle of the layered structure can further improve the nonpermeability of the sealing member to gases. The thin aluminum layer 51E also functions as a heat insulating layer and a light blocking layer, which allows the recording head unit 17 to be packed and stored in the stable condition. Because the thin aluminum layer 51E is easily damaged, this layer is inserted in the middle of the layered structure.

It should be understood that the invention is not limited to the specific embodiment described above, and that many changes and substitutions can be made without departing from the scope of the invention.

For example, other gas-non-permeable layers, such as a poly(vinylidene chloride) layer, a moistureproof cellophane layer, and a vinyl chloride layer, may be included in the layered structure of the sealing member 50. Also, an aluminum or other metal layer may be formed on such a sheet material by vacuum evaporation, or alternatively, an aluminum or other metal leaf may be sandwiched between resin layers in the sheet material. It is not necessary for all the layers of the sheet material to be highly non-permeable to gases. If any one of them is non-permeable to gases, the others may be formed of an ordinary resin.

If polymethyl pentene resin is used as the base material of the sealing member 50, the sealing member can be burned as trash without generating dioxin.

Especially, the polyethylene layer 50A, i.e., the base material of the sealing member 50, can be replaced by a poly(vinylidene chloride) layer, a moistureproof cellophane layer, a vinyl chloride layer, or a polymethyl pentene resin layer. Because these materials are all highly non-permeable to gases, one of them can also be substituted for the polyethylene terephthalate layer 50D shown in FIG. 10.

In the embodiment, the nozzle protector 1 and the stopper 40 are attached to the recording head unit 17 after the recording head 18 is filled with the preservative solution. However, the preservative solution may be sucked out of the recording head 18 after it is filled in the recording head 18 in order to wet the inner surfaces of the channels 41 and the manifolds 42. Then, in this state, the nozzle protector 1 and the stopper 40 may be attached to the recording head unit 17.

The pouch-like sealing member 50, which is highly non-permeable to gases and sticks around the recording head unit 17, can reliably keep the inner surfaces of the channels 41 and the manifolds 42 wet. In this structure, the solution will never leak from the recording head 18.

Although the embodiment has been described using an example of an ink-jet printer, the invention can be applicable to various types of ink-jet recording apparatuses including facsimile machines.

What is claimed is:

1. A package for a recording head unit of an ink-jet recording apparatus, the recording head unit having a recording head filled with a preservative solution and defining an ink-inlet port at one end, to which an ink cartridge containing ink is detachably connectable, and nozzle holes at the other end, from which the ink is ejected, a space defined between the ink-inlet port and the nozzle holes inside the recording head unit being filled with the preservative solution, the package comprising a conforming sealing member that is non-permeable to gases and seals the entire recording head unit, wherein the recording head unit is vacuum packed in the sealing member to conform the sealing member to the recording head thereby substantially closing the nozzle holes and the ink inlet port.

2. The package according to claim 1, wherein the sealing member has a layered structure that includes a plurality of layers, at least one layer being non-permeable to gases.

3. The package according to claim 1, wherein the sealing member is a pouch-like sealing member made of a non-permeable sheet having a layered structure.

4. The package according to claim 2, wherein the layered structure of the sealing member includes at least two resin layers.

5. The package according to claim 4, wherein the sealing member includes a polyethylene terephthalate layer that is highly non-permeable to gases.

6. The package according to claim 5, wherein the layered structure of the sealing member includes a polyethylene layer, a nylon layer, and a polyethylene terephthalate layer.

7. The package according to claim 5, wherein the layered structure of the sealing member includes a poly(vinylidene chloride) layer, a nylon layer, and a polyethylene terephthalate layer.

8. The package according to claim 5, wherein the layered structure of the sealing member includes a moistureproof cellophane layer, a nylon layer, and a polyethylene terephthalate layer.

9. The package according to claim 5, wherein the layered structure of the sealing member includes a vinyl chloride layer, a nylon layer, and a polyethylene terephthalate layer.

10. The package according to claim 5, wherein the layered structure of the sealing member includes a polymethyl pentene resin layer, a nylon layer, and a polyethylene terephthalate layer.

11. The package according to claim 4, further including a printable face disposed in a middle region of the layered structure.

12. The package according to claim 2, wherein the layered structure of the sealing member includes a thin aluminum layer.

13. The package according to claim 12, wherein the layered structure of the sealing member includes a polyethylene layer, a nylon layer, a thin aluminum layer, and a polyethylene terephthalate layer.

14. The package according to claim 1, further comprising a nozzle protector that covers the nozzle holes is detachably attachable to the recording head unit, and a stopper is detachably attachable to the recording head unit such that the stopper covers the ink-inlet port until the ink cartridge is connected to the ink-inlet port.

15. The package according to claim 14, wherein the nozzle protector is a U-shaped cover made of hard plastic.

16. The package according to claim 15, wherein the nozzle protector includes a base plate, a first arm extending from one end of the base plate, and a second arm extending from another end of the base plate.

17. The package according to claim 16, wherein the nozzle protector includes multiple caps disposed at an inner face of the base plate at positions corresponding to the nozzle holes of the recording head unit.

18. The package according to claim 17, wherein the first arm and the second arm of the nozzle protector each define a projection that is insertable into a hole defined in each side of the recording head unit.

19. The package according to claim 18, wherein each cap of the nozzle protector is made of an elastic material, and includes a rectangular top lid and a rib projecting from a periphery of the top lid.

20. A method for packaging a recording head unit of an ink-jet recording apparatus, the method comprising the steps of:

filling an interior of the recording head unit with a preservative solution;

sealing the entire recording head unit with a conforming sealing member that is non-permeable to gases; and evacuating trapped atmosphere from the conforming sealing member in which the recording head is inserted.

21. The method according to claim 20, further comprising the steps of:

forming the sealing member as a sleeve-like sealing member made of a non-permeable material;

sealing one end of the sleeve-like sealing member, while leaving the other end open, so as to form a pouch;

inserting the recording head unit in the pouch-like sealing member; and sealing the open end of the sealing member.

22. The method according to claim 21, wherein the recording head unit defines an ink-inlet port at one end, to which an ink cartridge containing ink is connectable, and nozzle holes at the other end, from which the ink is ejected, the method further comprising the steps of:

covering the nozzle holes with a nozzle protector; and covering the ink-inlet port with a stopper when the ink cartridge is not connected to the ink-inlet port.

23. A combination of a recording head unit of an ink-jet recording apparatus and a conformable package for packaging the entire recording head unit, the recording head unit being filled with a preservative solution, and the package comprising a sealing member that is non-permeable to gases and seals the entire recording head unit and further comprising a nozzle protector that covers the nozzle holes is detachably attachable to the recording head unit, and a stopper is detachably attachable to the recording head unit such that the stopper covers the ink-inlet port until the ink cartridge is connected to the ink-inlet port.

* * * * *